United States Patent [19]

Hyman

[11] Patent Number: 5,535,815

[45] Date of Patent: Jul. 16, 1996

[54] PACKAGE-INTERFACE THERMAL SWITCH

[75] Inventor: Nelson L. Hyman, Randallstown, Md.

[73] Assignee: The United States of America as represented by the Secretary of the Navy, Washington, D.C.

[21] Appl. No.: 449,581

[22] Filed: May 24, 1995

[51] Int. Cl.$^6$ .......................... G05D 23/00; F28F 27/00
[52] U.S. Cl. .............................. 165/32; 165/96; 165/185
[58] Field of Search ................................ 165/32, 96, 185, 165/41; 244/57, 158 R, 158 A, 163

[56] References Cited

U.S. PATENT DOCUMENTS

| | | | |
|---|---|---|---|
| 3,229,755 | 1/1966 | Komarow | 165/96 X |
| 3,438,430 | 4/1969 | Kestemont | 165/32 |
| 3,463,224 | 8/1969 | Myers | 165/32 |
| 3,603,530 | 9/1971 | Easton et al. | 244/15 C |
| 3,749,156 | 6/1973 | Fletcher et al. | 165/32 |
| 3,957,107 | 5/1976 | Altoz et al. | 165/32 |
| 4,273,183 | 6/1981 | Altoz et al. | 165/32 |
| 4,281,708 | 8/1981 | Wing et al. | 165/32 |
| 4,388,965 | 6/1983 | Cunningham et al. | 165/32 |
| 4,402,358 | 9/1983 | Wolf | 165/32 |
| 4,420,035 | 12/1983 | Hewitt | 165/32 |
| 4,454,910 | 6/1984 | Miyazaki | 165/32 |
| 4,580,748 | 4/1986 | Dalby | 244/158 R |
| 4,673,030 | 6/1987 | Balilius | 165/32 |
| 4,699,685 | 6/1987 | Dalby | 244/158 R |
| 4,706,740 | 11/1987 | Mehefkey | 165/104.14 |
| 5,148,860 | 9/1992 | Bettini | 165/41 |
| 5,318,108 | 6/1994 | Benson et al. | 165/96 |

FOREIGN PATENT DOCUMENTS

| | | | |
|---|---|---|---|
| 225548 | 12/1984 | Japan | 165/32 |
| 155893 | 8/1985 | Japan | 165/32 |

*Primary Examiner*—Leonard R. Leo
*Attorney, Agent, or Firm*—Thomas E. McDonnell; Charles J. Stockstill

[57] ABSTRACT

The package-interface thermal switch (PITS) is an active temperature control device for modulating the flow of thermal energy from satellite equipment, such as electronic modules or batteries, to the satellite mounting deck which serves as a heat sink. PITS comprises a mounting bolt made of a shaped memory alloy (SMA) actuating bolt and a non-metallic rod with a helical spring surrounding it forming a mounting bolt for a satellite equipment package. At least four mounting bolts are used for installing the equipment package and are preloaded to a predetermined stress representing the desired thermal conductance between the heat sink and the package. The SMA actuating bolt is in thermal contact with the component or package and expands or contracts as the result of changing package temperature and the helical "return" spring forces against the SMA actuating bolt portion of the PITS, increasing ("hot-on" condition) or decreasing ("cold-off") condition) the pressure of the package against the mounting deck. As the PITS changes its total length, the thermal conductance between the two objects is increased or decreased. Thus thermal conductance changes as a direct function of package temperature, resulting in active temperature control. The simple design of the PITS reduces the cost and weight of the thermal control subsystem in satellites and its high reliability eliminates the requirement for thermal design verification testing.

5 Claims, 2 Drawing Sheets

5,535,815

PACKAGE-INTERFACE THERMAL SWITCH

BACKGROUND OF THE INVENTION

1. Field of the Invention

This invention pertains to a temperature control device for satellite components and more particularly to a thermal switch for actively controlling heat flow rate between satellite components.

2. Description of Related Art

In many areas of technology, such as cryogenic refrigeration, spacecraft,and electronics, it is desirable to control the flow of heat from one area to another. In spacecraft, the traditional approach to temperature control for spacecraft component packages consists of mounting components with low interface resistances to "heat-sinking" decks and radiators. Severe requirements of maintaining narrow component package temperature ranges under wide variations of internal dissipation and external environment dictate requirements for decks and radiators which translate to the thermal design of the Although this approach has been used for decades, passive temperature control of a typical spacecraft is inherently handicapped by variations of environmental fluxes and internal dissipation, surface optical properties, and uncertainties of flight temperature prediction, often equivalent to temperature variations on the order of 40° C. With simple passive thermal control not satisfying requirements, semi-active (thermostats and heaters), or active (VCHP, CPL, louvers) control devices must often be employed, possibly accompanied by increased cost, weight, power, and testing complexity.

Removal of heat from heat-generating equipment on satellites and other spacecraft has been accomplished previously by various forms of heat pipes, phase-change medium, flexible heat conductors, such as a heat strap and reflectors in various combinations and in conjunction with other components. These devices convey heat to unique forms of heat exchangers, such as in Basilius, U.S. Pat. No. 4,673,030, where a heat tube in a tube in combination with a heat-exchange plate is taught; and in Hewitt, U.S. Pat. No. 4,420,035, arcuate radiator panels in conjunction with heat tubes in a circular spinning satellite are taught.

Heat switching devices with paraffin actuators, actuators based on the expansion of water as it freezes, and bi-material actuators based on two materials with large differences in coefficients of thermal expansion have been utilized. Paraffin actuators, while accepted state-of-the-art satellite hardware, are of high volume, mass, complexity, and high cost. Water-ice actuators, although they show future promise for high-force and reliable actuation, function only in the −5° to 0° C. range. Bi-material actuators are very large have too much thermal conductivity in the "off" mode.

While each prior art device has some advantage, none will automatically control the temperature of a package attached to a mounting platform serving as a heat sink at a low weight and cost.

SUMMARY OF THE INVENTION

The object of this invention is to provide a device to automatically control the temperature of a package containing temperature sensitive components attached to a mounting platform which serves as a heat sink.

Another object of the invention is to provide a temperature control device that is light weight and of low cost.

An object of this invention is to provide a device with such dependable and predictable performance that a satellite would require no thermal design verification testing.

These and other objectives are obtained with the package-interface thermal switch (PITS). The basis of operation of the PITS is a shape memory alloy (SMA) actuating bolt which shrinks in length on increased temperature and a helical spring to provide a force to increase bolt length with decreased temperature. The SMA actuating bolt is in thermal contact with the package and expands or contracts as a function of the package's temperature. As bolt length changes, the interface contact pressure between the package and mounting deck is increased or decreased, increasing or decreasing the thermal conductance between the two objects. This control of conductance as a function of package temperature, independent of heat dissipation, is the basis of PITS active temperature control.

DESCRIPTION OF THE PREFERRED EMBODIMENT

Figure 1:
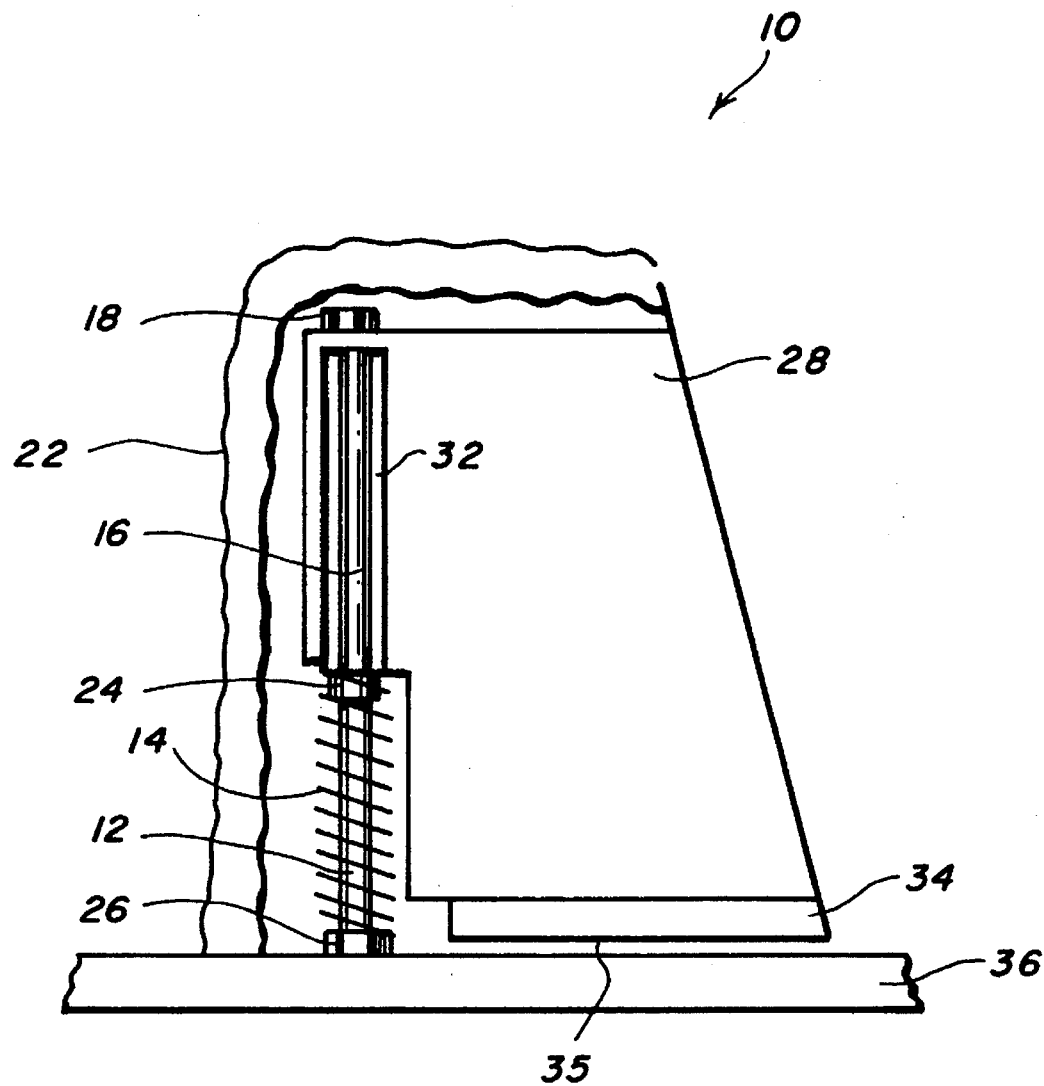
FIG. 1 is a schematic of the package-interface thermal switch.

The package-interface thermal switch (PITS) 10, referring to FIG. 1, is used to best advantage in conjunction with a heat-sinking spacecraft mounting deck 36 at temperatures anywhere within a wide "cold" range which is achieved by means of external radiators of non-exotic, inexpensive surfaces having no critical optical properties. The package-to-deck (P-to-D) thermal conductance is automatically controlled so as to maintain a predetermined package temperature range. Typical mounting temperature ranges are from 0° to 15° C. for nickel-hydrogen (NiH$_2$) or nickel-cadmium (NiCd) batteries and from—5° to 45° C. for typical electronic equipment.

The package-interface thermal switch (PITS) 10 is comprised of the following to form one continuous structure. First, a shaped-memory-alloy (SMA) actuating bolt 16 which is in thermal contact with the package 28 through the use of a high-thermal-conductance silicon 32. The SMA actuating bolt 16 varies thermal conductance across package-to-deck (P-to-D) interfaces 35 in automatic response to package temperature by changing length proportional to the change in temperature of the package 28. Although any shape-memory alloy may be used for the SMA actuating bolt 16, dependent upon the desired temperature range desired, the preferred alloy is a nickel-titanium-copper alloy that may be acquired from any manufacturer currently known to those practicing the art, such as TiNi Alloy Co. of San Leandro, Calif. Secondly, a non-metallic bolt 12 attached to the SMA actuating bolt by a nut 24 that is a tension rod that helps to thermally isolate the actuating bolt 16 from the mounting deck 36. The bolt 12, can be of any high strength non-metallic material known to those practicing the art, however Meldin® 3000H manufactured by Furon Advanced Polymers Division of Bristol, R.I., is preferable. For example, a ⅜ inch diameter rod 12 ($A_N$=0.11 in$^2$) would sustain a tensile load of 3620 psi, or 11% of ultimate at 0.13% strain under a 400 lb load. A maximum length of the rod 12 to minimize conduction heat transfer is desired. Lastly, a helical spring 14 wrapped around the bolt 12, preferably ChrSi music wire 0.142 inches in diameter having a spring rate of 730 lb/in with an outer diameter of 0.75 inches and a length of 1.25 inches, although any metal spring having a suitable geometry and spring rate is acceptable. The spring is preloaded to a predetermined load and length by adjustment of the mounting nuts 18 and 26 to obtain the degree of pressure desired to be exerted upon the mounting deck 36 by the package 28 at a predetermined preload temperature, thereby obtaining the desired conductance. A helical spring 14 is preferred because it is a conventional spring and is easily adaptable to the PITS 10 geometry and has a fairly constant spring force with package 28 displacement. (The helical spring force changes <10% with a typical displacement of <0.03 inches.) However, by a proper selection of SMA alloys for the actuating bolt 16, the PITS 10 has the capability of being custom designed to meet any desired temperature requirement.

The actuating bolt 16 and tension rod 12 assembly are attached to the package 28 and mounting deck 36 by nuts 18 and 26, respectively. The P-to-D 35 interface-contact-pressure and conductance is modulated by the package 28 moving relative to the mounting deck 36 with temperature change as the result of the expansion and contraction of the SMA actuating bolt 16. Because of the force provided by the helical spring 14, as the SMA actuating bolt 16 expands in length the contact pressure between the package 28 and the mounting deck 36 is eased as the package 28 is pushed away. The reverse occurs when the SMA actuating bolt 16 shrinks due to a temperature increase of the package 28: the spring 14 is further compressed and the pressure between the package 28 and deck 36 is increased. If the package 28 requires additional heat while in the "cold-off" position, a thermal blanket 22 placed over the package 28 for thermal insulation and heaters (not shown) that are well known to those practicing in the art may be utilized to maintain a low temperature operating condition.

In the "hot-on" condition, the SMA actuating bolt 16 returns to its shorter length to exert a package-to-deck interface pressure of up to 500 psi. Due to the variability in packages to be mounted, the PITS 10 geometry is to be custom designed to accommodate particular properties such as desired temperature range, package height, footprint area, and minimum and maximum thermal dissipation rates.

The three forces involved within the PITS 10 have the relation $$F_t = F_s + F_{if}/NA \qquad (1)$$

where $F_t$ is the total tension force sustained by each SMA actuating bolt 16, $F_s$ is the spring 14 force per SMA actuating bolt 16, $F_{if}$ is the force at the P-to-D interface 35 footprint, and NA is the number of actuating bolt-tension rod assemblies retaining the package 28.

Figure 2:
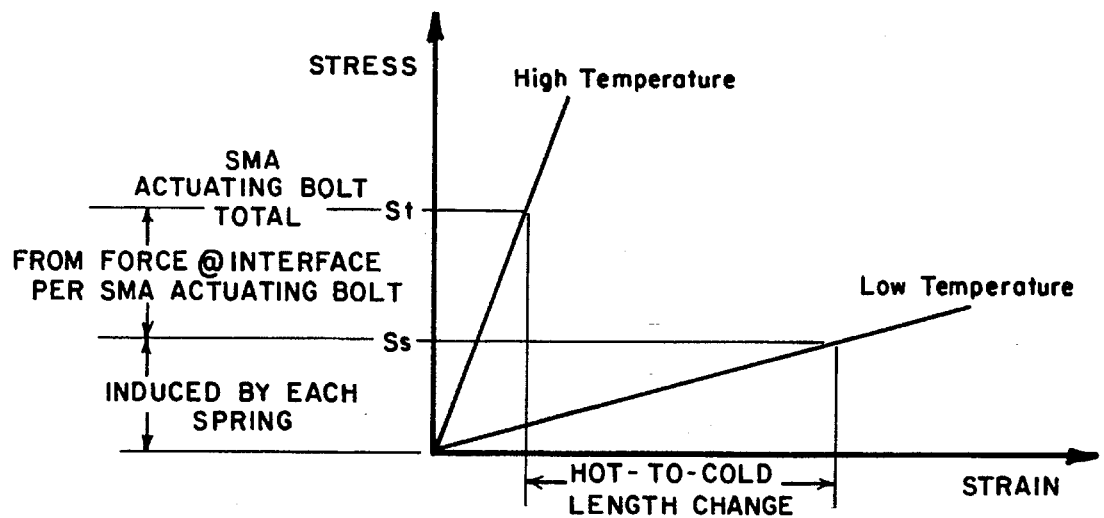
FIG. 2 is an illustrative stress vs strain diagram for the shape memory actuating bolt of the package-interface thermal
Figure 3:
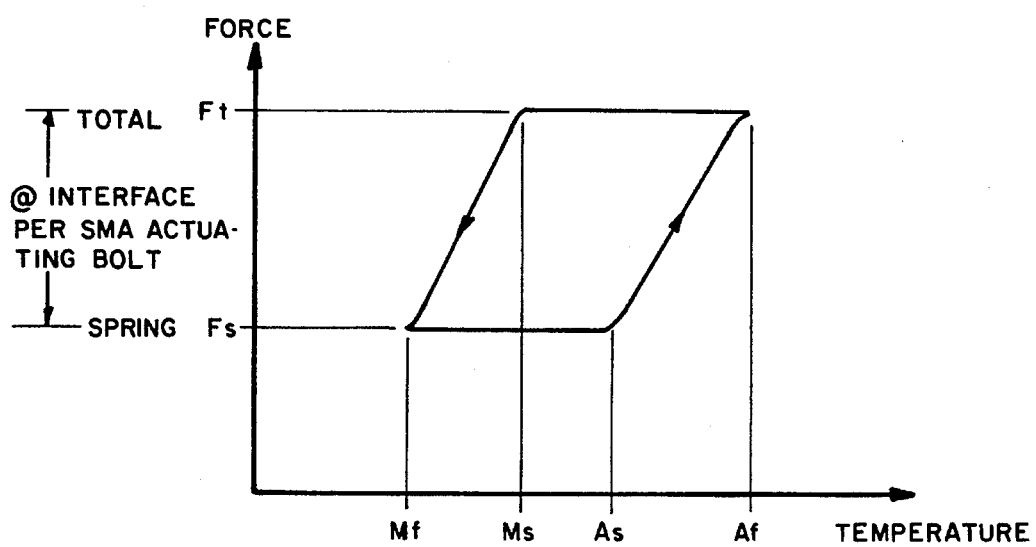
FIG. 3 is an illustrative of the force exerted on the mounting deck vs. temperature of the package for the package-interface thermal switch.

The functioning of the SMA actuating bolt 16 is based on the variation in SMA stiffness (modulus of elasticity) between low and high temperatures; for example, between approximately 10° to 30° C., or between its martensitic and austenitic conditions. The thermal-mechanical characteristics of typical SMA actuating bolts 16 is depicted in FIG. 2 where the variance in modulus of elasticity for the SMA actuating bolt 16 is depicted by the relationship between stress and strain at the low and high temperatures, and the relationship between SMA actuating bolt 16 tensile force and temperature in depicted in FIG. 3. In FIG. 3, M is the martensitic range, A is the austenitic range, s is start, and f is finish. Typical desired forces per SMA actuating bolt 16 are $F_s$=200 lbs, corresponding to the stress $S_s$, and $F_f$=400 lbs, corresponding to stress $S_f$ which corresponds to a 200 lb force per SMA actuating bolt 16 at the P-to-D interface 35, in the "hot-on" condition. The typical desired temperatures for an electronics component and battery are shown in Tables 1 and 2, respectively.

TABLE 1

| Condition | Target | Tolerance |
|---|---|---|
| Package-to-Interface Thermal Switch for Typical Electronics in "cold-off" | | |
| $M_f$ | 0° C. | −10° C. |
| $M_s$ | 10° C. | +5° C. |
| Package-to-Interface Thermal Switch for Typical Electronics in "hot-on" | | |
| $A_s$ | 20° C. | +5° C. |
| $A_f$ | 30° C. | +10° C. |

TABLE 2

| Condition | Target | Tolerance |
|---|---|---|
| Package-to-Interface Thermal Switch for Typical Battery in "cold-off" | | |
| $M_f$ | 0° C. | +5° C. |
| $M_s$ | 10° C. | ±5° C. |
| Package-to-Interface Thermal Switch for Typical Battery in "hot-on" | | |
| $A_s$ | 20° C. | ±5° C. |
| $A_f$ | 30° C. | −5° C. |

Referring again to FIG. 1, to enhance the transfer of thermal energy from the package 28 to the mounting deck 36, a "pad" or elastic interface-filler 34, typically 0.010 inches in thickness, is attached to the bottom of the package 28 using any commercial adhesive known to those practicing the art. Any material that efficiently conducts thermal energy is acceptable, however, a high-K elastomer, such as Cho-Therm® 1670, manufactured by Chomerics, Inc. of Woburn, Mass., is preferred. The relationship between contact pressure, $P_{if}$, in the range of 100 to 400 psi and the resultant thermal conductance through the Cho-Therm® pad is shown in Table 3.

TABLE 3

| $P_{if}$ | Thermal Conductance |
|---|---|
| 100 psi | 4.8 W/in² °C. |
| 200 psi | 5.6 W/in² °C. |
| 300 psi | 6.3 W/in² °C. |
| 400 psi | 6.7 W/in² °C. |

A desired maximum temperature drop across the package-to deck interface 35, $\Delta T_{P-D}$, is typically ≦2° C. The package interface footprint, $A_{fp}$, can be expressed as $$A_{fp} = Q/(CND*\Delta T_{P-D}). \qquad (2)$$

Where Q is the package dissipation in watts to be transferred from the package 28 to mounting deck 36, and CND is the conductance across the interface pad 35. The footprint area may also be expressed in terms of the total squeezing force at the interface 35, $F_{tot}$, and the resultant pressure on the pad 34, $P_{if}$:

$$A_{fp} = F_{tot}/P_{if} \quad (3)$$

From Eqs. (2) and (3), and assuming a $F_{tot}=800$ lb which is recommended during a sustained launch vibration environment, $$P_{if}/CND = 1600/Q \quad (4)$$

The $P_{if}/CND$ ratio can be obtained from the conductance vs. pressure data previously tabulated in Table 3 to calculate a heat flow across the package-to-deck interface 35 as shown in Table 4.

TABLE 4

| Interface Pressure | $P_{if}$/CND | Q, watts |
| --- | --- | --- |
| 100 psi | 21 | 76 |
| 200 psi | 36 | 44 |
| 300 psi | 48 | 33 |
| 400 psi | 60 | 27 |

From Table 4, the combination of 200 psi and 44 W has been selected as a representative design point.

The package-interface thermal switch is adaptable to any type of spacecraft component which can be heat-sunk to a structure or deck, and is capable of maintaining a predetermined narrow range of package temperatures over a very wide range of internal dissipation and external environment, with a high ratio of on-to-off package-to-deck conductances. Package temperature control is achieved with relatively small additional mass and the package-interface thermal switch in comprised of simple, inexpensive components and package modifications. The device is a simple, lightweight, inexpensive, highly reliable passive control having no moving parts and is able to dramatically relax the spacecraft temperature requirements, e.g., structure and deck temperatures in the range of −200° to 10° C. There is no need for active temperature control on the entire satellite because of the passive control exerted by the package-interface thermal switch. Also, exterior radiators of non-exotic, inexpensive surfaces, with non-critical geometry and optical properties, are permitted. The highly predictable behavior of the package-interface thermal control could eliminate the need for costly thermal design verification testing of the spacecraft.

A satellite launch and ascent vibration environment prohibits a "cold-off" package-to-deck separation, so package temperatures at launch and through ascent are to readily be maintained above 10° C. The high-contact pressures generated by the package being in a "hot-on" position will enable the package to remain secure on the deck.

Although the invention has been described in terms of the exemplary preferred embodiment thereof, it will be understood by those skilled in the art that still other variations and modifications can be affected in this preferred embodiment without detracting from the scope and spirit of the invention.

What is claimed is:

1. A temperature control system comprised of:
    a package to be temperature controlled in which thermal energy is controllably dissipated to a heat sink whose temperature is lower than the temperature of the package;
    a plurality of thermal switches functioning as temperature control devices for controlling the transfer of thermal energy from the package to the heat sink; and
    said thermal switches being further comprised of
        a shaped memory actuating bolt that expands or contracts according to the temperature of the package which is temperature-controlled;
        a non-metallic bolt affixed to a first end of the shaped memory actuating bolt to thermally insulate the shaped memory actuating bolt and the package from the heat sink;
        a spring surrounding the metal bolt between the first end of the shaped memory actuating bolt and the heat sink acting against a force created by an expansion or contraction of the shaped memory actuating bolt causing the assembly to generate more or less contact pressure against the heat sinks; and
        means for setting an initial force of the system against the heat sink prior to expansion or contraction of the shaped memory actuating bolt.

2. A thermal control device, as in claim 1, further comprising an elastic interface filler between the package and heat sink to increase thermal conductance between the package and the heat sink.

3. A method for constructing a thermal control device, comprising the steps of:
    selecting a metal rod having shaped memory characteristics that expands or contracts when subjected to a varying temperature;
    selecting a non-metallic tension rod having a heat insulating and high stiffness characteristics;
    affixing the metal rod to the non-metallic tension rod; and
    placing a spring around the non-metallic tension rod so as to provide a predetermined tension force on the metal rod.

4. A thermal switch comprised of:
    a shaped memory metallic bolt, that expands or contracts in response to an applied temperature, affixed to an insulating non-metallic bolt;
    means acting against a force created by an expansion or contraction of the shaped memory actuating bolt thereby generating more or less contact pressure against a heat sink; and
    means for setting a predetermined stress within the shaped memory bolt and non-metallic bolt.

5. A thermal switch comprised of:
    a shaped memory actuating bolt having a first and second end;
    a non-metallic insulating bolt affixed to a first end of the shaped memory bolt;
    a spring surrounding the non-metallic bolt, having a first and second end, bearing against the shaped memory actuating bolt on the first end and against a heat sink on the second end; and
    means for setting an initial force between a package affixed to the second end of the shaped memory actuating bolt and the heat sink at the second end of the non-metallic bolt.

\* \* \* \* \*